US006896451B2

(12) United States Patent
Oberheim

(10) Patent No.: US 6,896,451 B2
(45) Date of Patent: May 24, 2005

(54) DEPTH ROD ADJUSTMENT MECHANISM FOR A PLUNGE-TYPE ROUTER

(75) Inventor: Stephen C. Oberheim, Des Plaines, IL (US)

(73) Assignee: Credo Technology Corporation, Broadview, IL (US)

(*) Notice: Subject to any disclaimer, the term of this patent is extended or adjusted under 35 U.S.C. 154(b) by 9 days.

(21) Appl. No.: 10/685,281

(22) Filed: Oct. 14, 2003

(65) Prior Publication Data

US 2005/0079025 A1 Apr. 14, 2005

(51) Int. Cl.[7] .................................................. B23C 1/20

(52) U.S. Cl. ....................... 409/131; 409/182; 409/210; 144/154.5; 144/136.95; 700/168

(58) Field of Search ................................ 409/181–182, 409/175, 180, 184, 210, 214, 218, 204, 193, 186–187, 194, 206–209, 131–132; 144/154.5, 136.95, 371; 408/16; 700/168

(56) References Cited

U.S. PATENT DOCUMENTS 4,272,821 A * 6/1981 Bradus ....................... 409/182
4,513,381 A * 4/1985 Houser et al. .............. 700/168
4,636,961 A * 1/1987 Bauer .......................... 700/168
5,094,575 A * 3/1992 Kieser et al. ............... 409/182
5,191,921 A * 3/1993 McCurry ................. 144/154.5
5,320,463 A * 6/1994 McCurry et al. ........... 409/182
5,725,036 A * 3/1998 Walter ......................... 409/182
6,474,378 B1 * 11/2002 Ryan et al. ............. 144/154.5
6,488,455 B1 * 12/2002 Staebler et al. ............. 409/182
6,520,270 B2 * 2/2003 Wissmach et al. .......... 173/170
6,666,242 B1 * 12/2003 Liao ........................... 409/210

* cited by examiner

*Primary Examiner*—Erica Cadugan
(74) *Attorney, Agent, or Firm*—Greer, Burns & Crain, Ltd.

(57) ABSTRACT

A plunge-type router is disclosed which is useful for either freehand or router table mounted operation. The router has a base and a motor housing assembly with the base being adjustable relative to the motor housing assembly and operates in a conventional plunge router operation, but has an depth rod adjusting and measuring mechanism that includes an electronic measuring system with a digital display and control functionality that enables a user to accurately measure the position of a depth rod and thereby accurately set a depth of cut value which is displayed on a digital readout.

27 Claims, 8 Drawing Sheets

DEPTH ROD ADJUSTMENT MECHANISM FOR A PLUNGE-TYPE ROUTER

The present invention generally relates to power hand tools and, more particularly, to plunge-type routers.

BACKGROUND OF THE INVENTION

Plunge-type routers are well known and commonly used to cut grooves, edges and a variety of shapes in work pieces made of wood and other materials. The shapes are determined by the kind and shape of router bits used, the depth of cut of the bit and the path of travel by the router bit relative to the work piece. A plunge router is constructed to move the router bit toward and away from the work piece when the router is being operated in a freehand manner. It can often also be mounted to a router table so that the router bit extends through an opening in the top of the table. The depth of cut of the router bit is typically determined by an adjustable depth stop system which may or may not include means for locking the router in its plunged position.

During freehand operation, the plunge router may be supported on the work piece with the bit retracted and placed in the desired location so that when it is turned on and plunged downwardly, the router bit advances into the work piece and the operator then moves it relative to the work piece to complete the desired routing operation. To do the plunging operation, the operator must exert a downward force on the motor housing assembly, generally by pressing on attached handles to move the router bit into contact with the work piece. The motor housing assembly is typically biased to automatically retract the router bit from the work piece when the downward force imparted by the operator is removed.

Plunge routers generally include a plunge adjustment mechanism that enables the operator to control the distance the router bit can move toward the work piece and thereby determine its depth of cut. As is well known to those who have used plunge type routers, the adjustment of the stop system must be carefully done to achieve the desired depth of cut. Because the type and size of various router bits are very different, it is prudent if not necessary to recalibrate or reset the adjustment means after any manipulation of the router bit to insure that it has been accurately set to achieve the desired depth of cut. There are many other devices that attempt to accurately set the depth adjustable stop to provide an accurate depth of cut, including adjustable rods, scales with indicators, micrometer type adjusters and other systems. Such adjustable stop mechanisms in the prior art are generally hand manipulated and some may have a printed scale or other indicia located on the mechanism for use in providing a specified depth of cut. However, it is still necessary for users to carefully measure the depth of cut in one way or another to insure that the desired cut will be made. In this regard, it is often common practice to perform a test cut on a scrap piece and actually measure the result and to iteratively adjust the stop mechanism until the proper result is achieved.

SUMMARY OF THE INVENTION

A plunge-type router is disclosed which is useful for either freehand or router table mounted operation. The router has a base and a motor housing assembly with the base being adjustable relative to the motor housing assembly and operates in a conventional plunge router operation, but has an depth rod adjusting and measuring mechanism that includes an electronic measuring system with a digital display and control functionality that enables a user to accurately measure the position of a depth rod and thereby accurately set a depth of cut value which is displayed on a digital readout.

Alternate embodiments include motorized depth adjusting mechanisms to adjust the depth rod position and thereby adjust the depth of cut of the router during operation, as well as an embodiment that is a hybrid router which has a removable motor assembly that can be coupled to a plunge-type router base.

DETAILED DESCRIPTION

Figure 1:
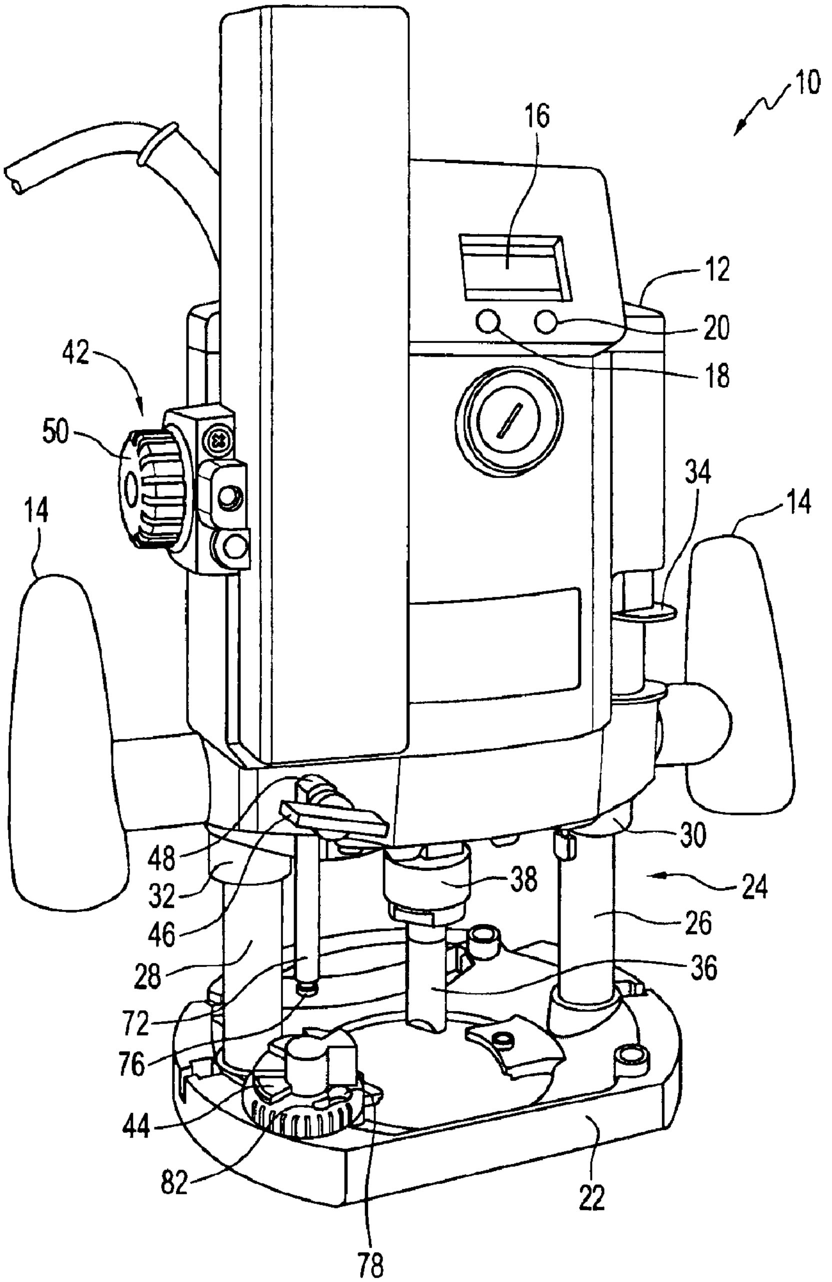
FIG. 1 is a perspective front view a preferred embodiment of the plunge router of the present invention.
Figure 2:
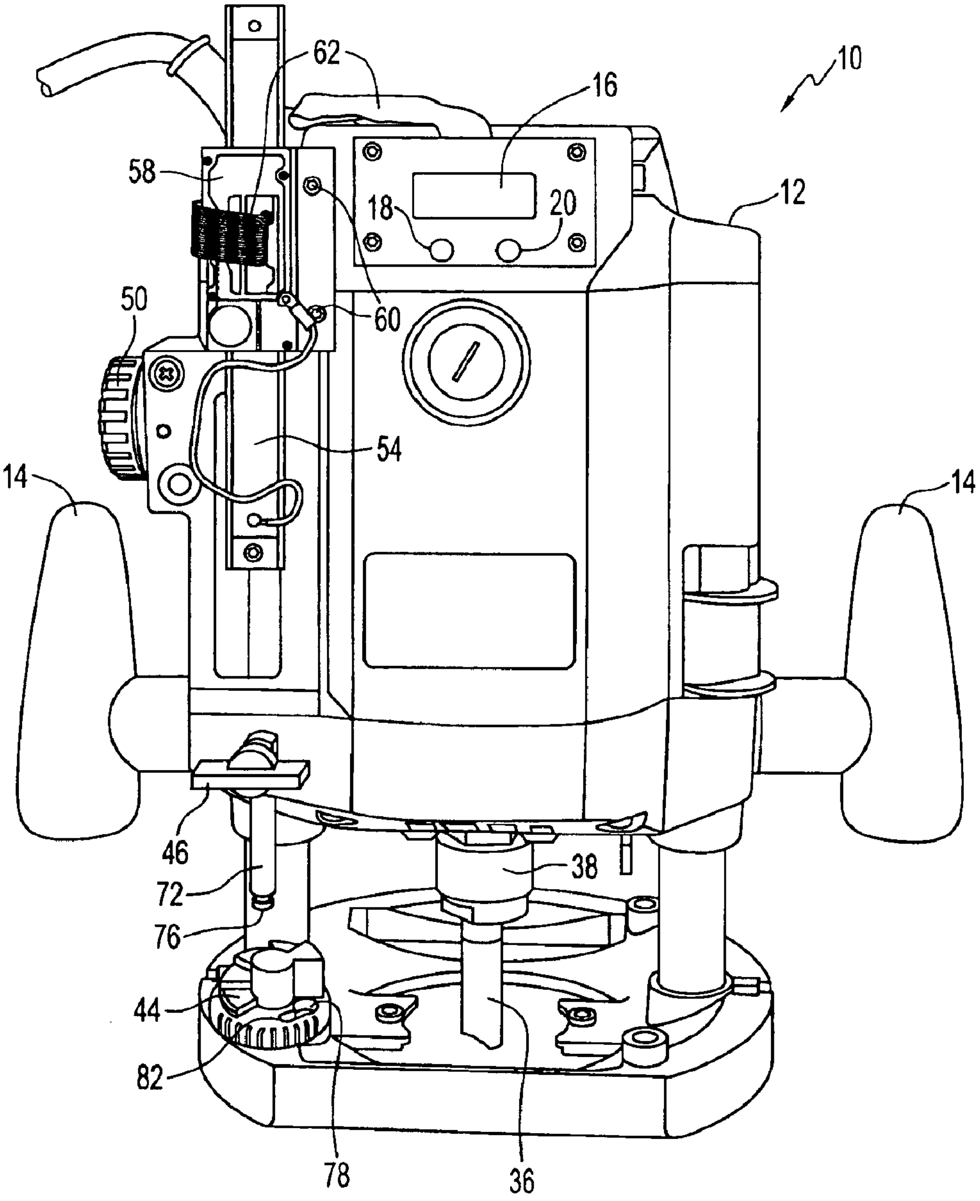
FIG. 2 is another perspective front view of the router shown in FIG. 1 with portions removed.
Figure 3:
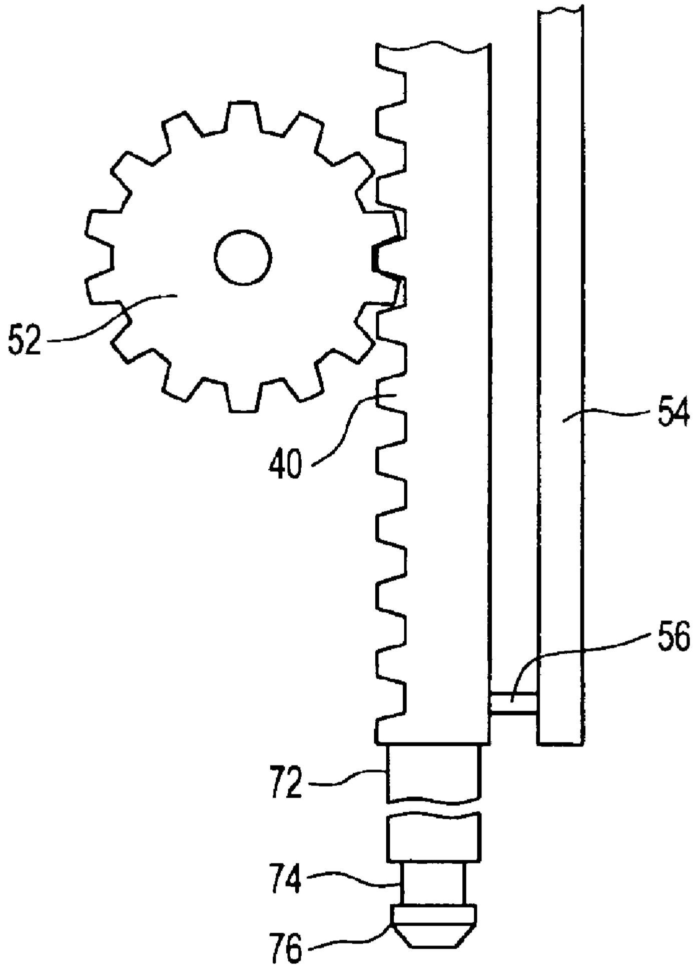
FIG. 3 is an idealized view of the side of a portion of the construction of the embodiment shown in FIGS. 2 and 3.

A preferred embodiment of the present invention is shown in FIGS. 1–3 and is indicated generally at 10. The router has a motor housing assembly 12 that includes a pair of handles 14 that are preferably integrally formed with the housing assembly. The router has a digital display 16 that includes a pair of pushbutton switches 18 and 20 that are used to control the manner in which the display operates and to determine the setting of the depth of cut as will hereinafter be explained. The housing assembly 12 is connected to a base 22 by a depth adjusting assembly, indicated generally at 24, which includes a pair of plunge posts 26 and 28 that fit in and are moveable relative to cylindrical channels 30 and 32 that are part of the housing assembly 12. The router 10 is a plunge type router in that when a lock 34 is released by the user, the housing assembly can be raised and lowered relative to the base 22 to control the depth of cut of a router bit 36 that is secured in a collet 38 that is attached to the output shaft of a motor (not shown) that is a part of the housing assembly 12.

The housing assembly is generally biased in the upward direction so that it will automatically raise itself relative to the base 22 when the locking mechanism 34 is released. During operation, when a user releases the locking mechanism 34 and forces the handles downwardly, the router bit 36 will engage a work surface. The depth of the cut that may be made is a function of the amount of downward movement by the housing assembly. To accurately cut at a desired depth, a depth rod 40 which is part of a depth rod adjustment mechanism indicated generally at 42 can be vertically adjusted relative to the base 22. A rotatable turret 44 may be provided to assist in providing different predetermined depth of cut set positions.

The depth rod adjusting mechanism 42 includes a locking lever 46 which has a threaded screw that engages a threaded opening in a boss 48. The end of the screw is capable of contacting the side of the depth rod 40 to secure its position when the locking lever 46 is rotated into engagement with it.

Referring to FIG. 2, an adjusting knob 50 is connected to a pinion gear 52 (see FIG. 3) that has outer teeth that engage a rack that is formed in one face of the depth rod 40. A sensor rail 54 is attached to the depth rod by screws 56 or the like so that when the knob 50 is rotated, the pinion gear will cause the depth rod to be vertically moved in an incremental manner, assuming that the locking lever 46 has been loosened. A sensor element 58 is secured to the housing assembly 12 by screws 60 and the sensor rail 54 has copper pads along its length that are positioned to provide a changing capacitance that is sensed by the sensor element 58 and which can thereby provide accurate measurement of incremental positions along the length of the rail. In this regard, it is preferred that the sensor rail and sensor element be similar to those that are presently used in commercially available digital calipers. Other linear sensor technologies based on inductance, magnetostrictive effects or resistive elements can also be used. The signals that are sensed by the sensor element are applied to a ribbon connector 62 that extends to a printed circuit board that contains the digital display 16, which is also shown in detail in FIG. 8. The sensor is very accurate and may measure depth changes to hundredths of an inch or in tenths of a millimeter.

To set a depth of cut, the locking lever 46 is first loosened so that the depth rod 40 can be adjusted. The operator then presses down on the handle so that the router bit 36 is brought into contact with the work surface and the lock 34 is then applied to hold the bit in contact with the work surface. The user then adjusts the knob 50 to bring the depth rod 40 into contact with one of the five surfaces of the turret 44. The user then uses the locking lever 46 to lock the depth rod 40 in place. The operator then depresses the pushbutton 20 to reset or zero the display. After that has been done, the user unlocks the locking lever 46 so that the depth rod can be moved, and he then adjusts the knob 50 to raise the depth rod 40 while watching the digital display 16 until the desired plunge depth is indicated on the display, whereupon the user then tightens the locking lever 46 to lock the depth rod 40 in place. The plunge depth has then been accurately set.

This embodiment is adapted to be mounted to a router table which inverts the router so that the router bit will extend through an opening and engage the underside of a work piece. When used in such a router table, the rod is locked to the turret 44 and the adjusting knob 50 acts to raise and lower the motor housing and thereby adjust the protrusion height of the bit above the table surface. The depth rod can be adjusted, the display zeroed and the depth of cut determined by manipulating the knob 50 while viewing the display.

Figure 4:
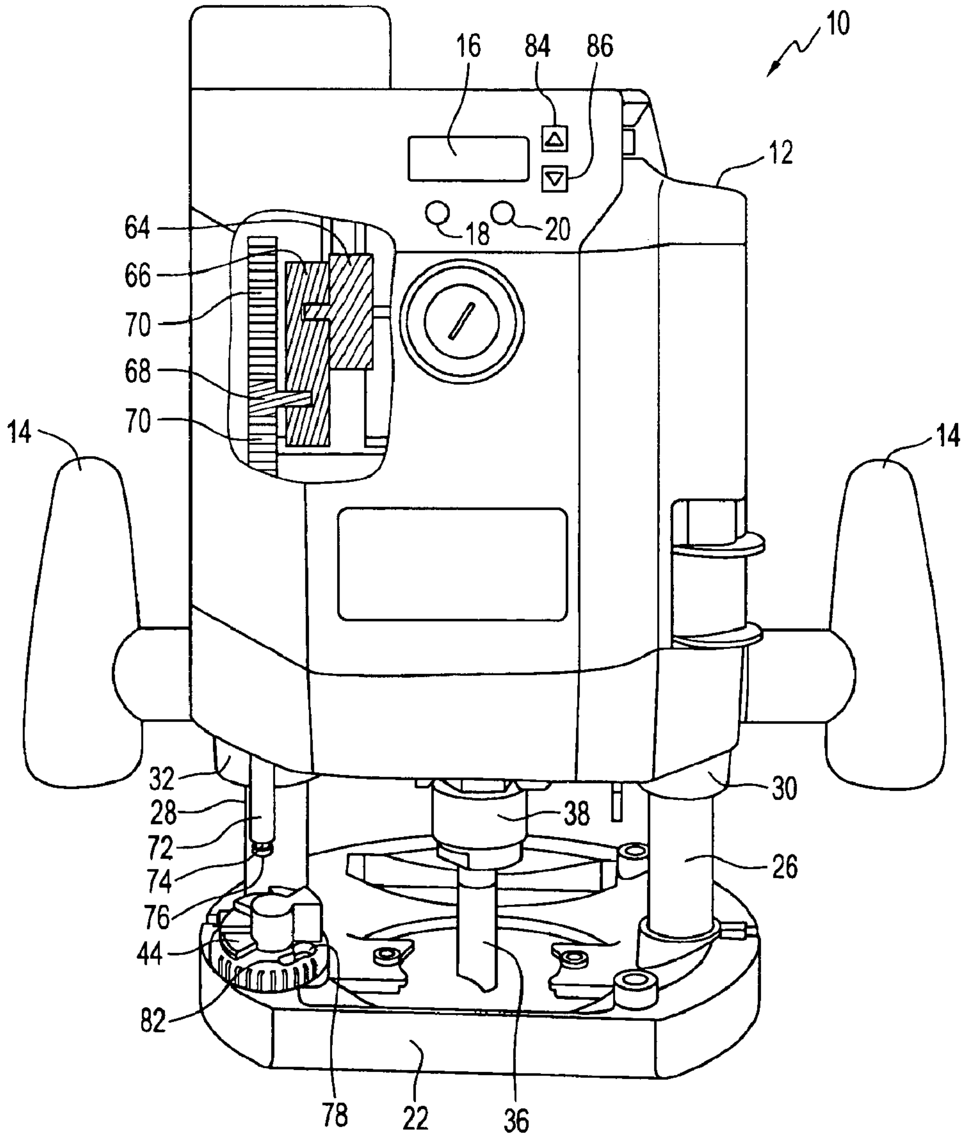
FIG. 4 is a perspective front view of a second preferred embodiment of the plunge router of the present invention, with portions removed and illustrating in idealized fashion the internal construction of the embodiment.
Figure 5:
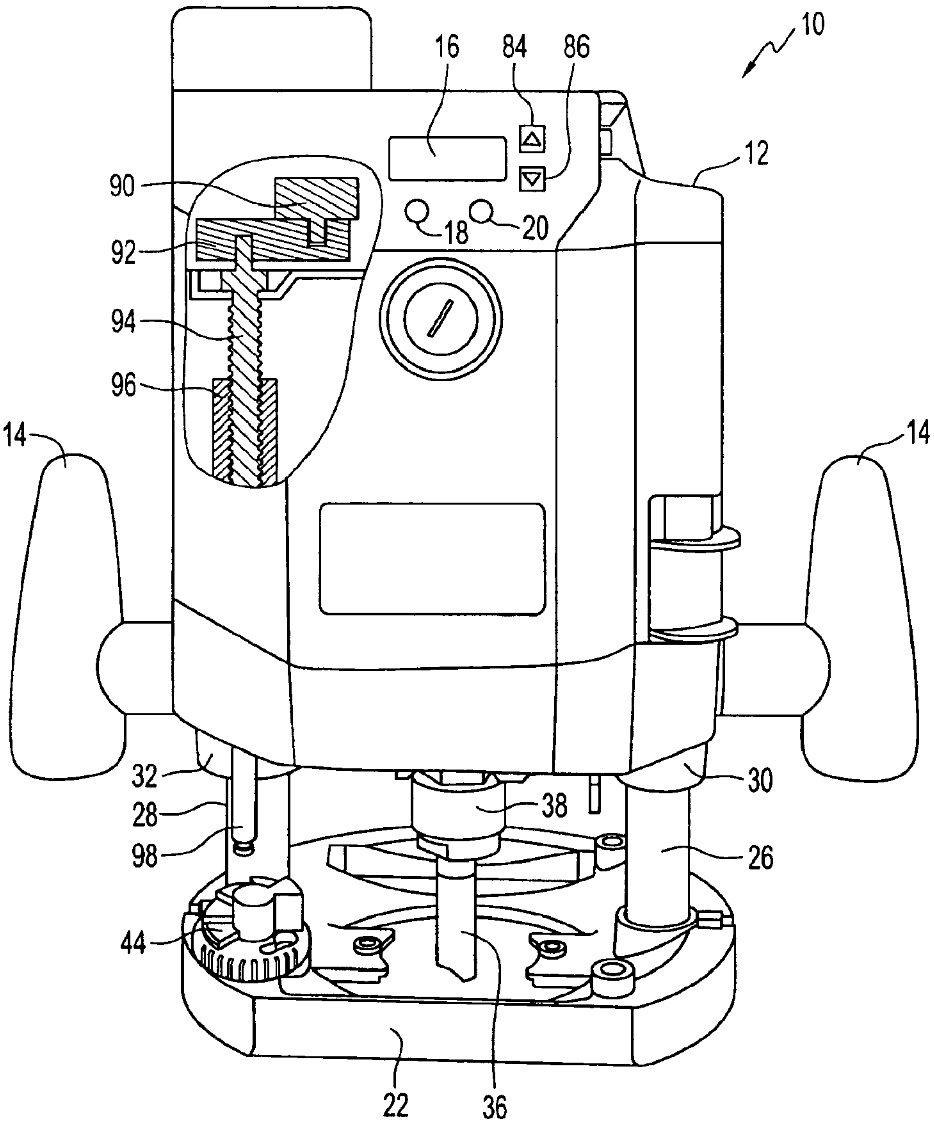
FIG. 5 is a perspective front view of a third preferred embodiment of the plunge router of the present invention, with portions removed and illustrating in idealized fashion the internal construction of the embodiment.

A second and third embodiment of the router is shown in FIGS. 4 and 5. Reference numbers in these embodiments may be the same as that used in the embodiment shown in FIGS. 1–3 for components that are common to the embodiments and are similar to one another. It is not intended that components that have the same number in various embodiments necessarily be of identical construction. The common numbers are used for the sake of convenience.

With regard to the second embodiment shown in FIG. 4, this embodiment includes a motor 64 which is positioned to drive a gear mechanism 66 that has an output connected to a pinion gear 68 that engages the teeth of the rack portion of the depth rod 70 that extends to a generally cylindrical lower end portion 72 that has an annular recess 74 which defines an enlarged end 76. The end 76 is adapted to penetrate an enlarged opening 78 in the rotatable turret 40 and engage and be retained by a smaller keyhole portion 82 when the turret 44 is rotated. This embodiment also includes a pair of pushbuttons 84 and 86 which will activate the motor 64 to move it in the direction of the arrows. During operation of this embodiment, the user can use the motor 64 to bring the router bit into contact with the work piece similarly as described with regard to the first embodiment, zero the display and then the pushbuttons 84 and 86 to adjust the position of the depth rod 70 while reading the digital display. When the proper depth of cut is reached, the user releases the pushbutton that was running the motor 64 and the depth of cut has been set.

In this second embodiment, the router is adapted to be mounted to a router table which inverts the router so that the router bit will extend through an opening and engage the underside of a work piece as it is being manipulated on the router table. By locking the depth rod 70 into the keyhole 82, activation of the motor 64 will physically move the housing assembly 12 relative to the base 22. If the router is mounted in a router table, the display 16 can be inverted so that a user can read the depth of cut without reading it upside down.

A third embodiment of the router employs a motor 90 that drives a gear mechanism 92 that in turn drives a threaded output shaft 94 that engages the interior threads of a depth rod 96 that has an end portion 98 for engaging the turret 44. The motor 90, and gear mechanism 92 are mounted in the housing in a fixed position. While not shown, an outwardly extending anti-rotation pin is or the like is attached to the depth rod 96 and is configured to ride in a vertical recess or slot to prevent the depth rod from rotating when the shaft 94 is rotated. This assures that rotation of the output shaft 94 will cause the depth rod to move vertically relative to the housing 12. Pushbuttons 84 and 86 also control the operation of the motor to either raise or lower the depth rod 94 as in the second embodiment of the router. The end portion 98 of the depth rod has the same configuration as in the second embodiment so that the locking lever 80 can hold the depth rod in the same manner as in the second embodiment. This similarly enables the router to be mounted to a router table and have the depth of cut be accurately determined in the same manner as described with respect to the second embodiment. It should be appreciated that the embodiment of FIG. 1 can also incorporate the turret 44 having a keyhole 82 configuration but adjustment of the depth of cut must be done manually. However, the depth of cut can be accurately measured and displayed.

In either of the motorized embodiments of FIGS. 4–5, the sensor comprises a rotary sensing device operatively associated with the depth adjusting motor. The rotary sensing device generates rotary position signals.

Figure 6:
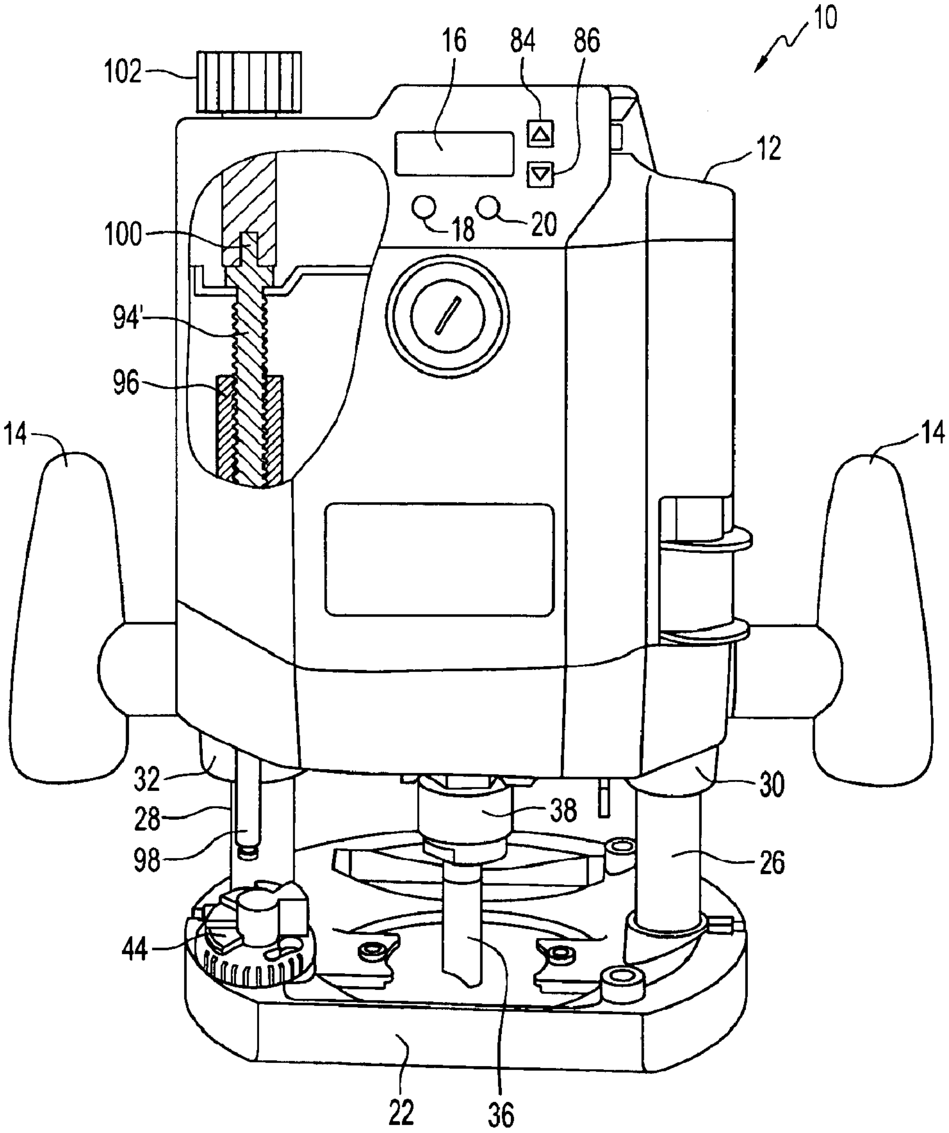
FIG. 6 is a perspective front view of a fourth preferred embodiment of the plunge router of the present invention, with portions removed and illustrating in idealized fashion the internal construction of the embodiment, this embodiment comprising a manually operable embodiment that is similar to the motorized embodiment of FIG. 5.

A fourth embodiment is shown in FIG. 6 which is similar to the embodiment of FIG. 5, except that it is a manually operable embodiment. A top extension 100 of a shaft 94' engages a knob 102 that can be manually rotated by a user.

When the knob is rotated, the shaft 94' rotates and causes the depth rod 96 to move vertically. A locking lever similar to the locking lever 46 used in the embodiment shown in FIGS. 1–3 may be provided if desired.

Figure 7:
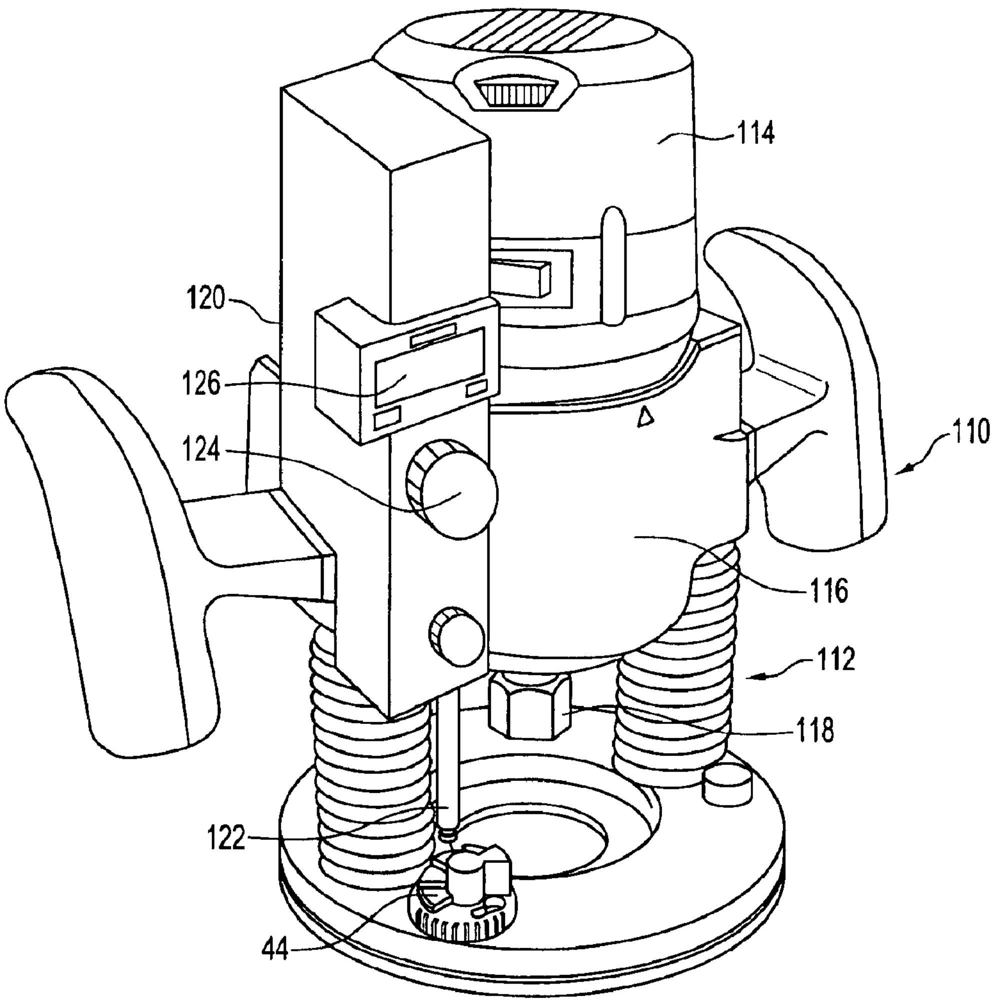
FIG. 7 is a perspective front view of a fifth preferred embodiment of the plunge router of the present invention, this embodiment comprising a manually operable embodiment that is similar to the embodiment of FIGS. 1–3, but configured as a hybrid router, with the motor assembly being mounted in a plunge router base.

A fifth embodiment is shown in FIG. 7 and comprises a hybrid router, indicated generally at 110, that has a plunge base assembly, indicated generally at 112, in which a motor assembly 114 can be attached. As shown, the motor assembly 114 is generally cylindrically shaped and can be inserted into a mounting portion 116 that has a cylindrical opening. The motor assembly has an output shaft to which a collet assembly 118 is preferably attached for securing a router bit or other tool to the router during operation attachment. The plunge base assembly 112 has a vertically oriented housing 120 in which a depth rod adjusting mechanism is contained, with the mechanism being similar to the embodiment of FIGS. 1–3 in that it has a rack and pinion operation, with the rack having a lower portion defining a depth rod 122, similar to the configuration shown in FIG. 3. It should also be understood that the embodiments shown in FIGS. 4–6 may be utilized in the hybrid router. If motorized embodiments are utilized, power must be provided from the motor assembly by a suitable cable and connector arrangement. A pinion gear is attached to a knob 124 and a locking knob 126 is also provided to lock the depth rod 122 in place once it has been positioned at a desired elevation. In a similar manner as has been described with regard to the embodiment of FIGS. 1–3, a sensor rail is attached to the depth rod and a sensor element is secured to the plunge base assembly for generating digital signals that are indicative of the position of the sensor element along the rail as previously described, which are displayed in a display 126 that is similar to the display 16 shown in FIG. 8.

Figure 8:
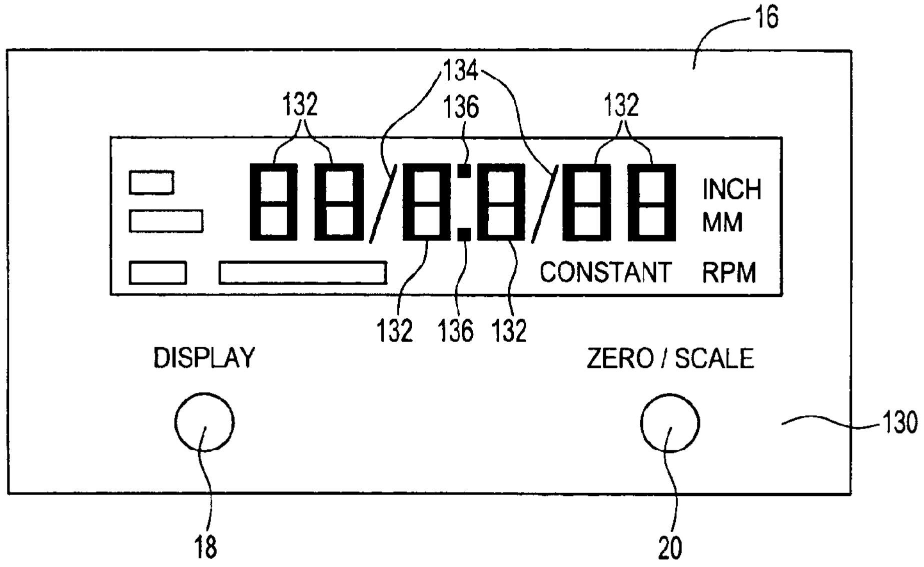
FIG. 8 is a front view of the display that is incorporated into several of the illustrated embodiments.

With regard to the display 16 and referring to FIG. 8, it is shown to have the display button 18 and a zero/scale button 20. In this regard, the actual buttons 18 and 20 may be mounted in the housing assembly 12 itself or may be located on a printed circuit board 130 and extend through an opening in the housing assembly. The preferred display 16 utilizes the pushbuttons 18 and 20 to change the functionality of the display. As shown, there are six 7-segment characters 132 as well as two slashes 134 and two decimal points 136 in addition to an inch icon and a millimeter icon. In the event that the speed of the motor powering the router bit can be adjusted, a constant RPM icon may be present or the operating speed of the motor may be displayed with the characters 102.

The display is one of a liquid crystal display or a light emitting diode display.

The display 16 is preferably designed to turn on with the same units that existed before the router was turned off and also operates as follows. If the display button 18 is pressed for less than ½ second, it may temporarily change the display and then return to the default after two seconds. If the display button is pressed for longer than ½ second, the display may cycle between speed adjustment and display, depth of cut as well as inverted (i.e., upside down) speed and inverted depth of cut. The zero/scale button when pressed for less than ½ second resets the depth of cut to zero and if it is held for more than ½ second, the scale will change from metric to inches or vice versa. When the change is made, the appropriate mm or inch icon will be switched on and off. The display buttons can also be designed operate in a non time dependent way. In this type of display, the display button cycles the display between displaying speed, depth of cut in English or metric numbers and depth of cut using inverted English or Metric numbers. The zero/scale button would act to zero the measurement.

When in the speed adjustment and display mode, the switches 84 and 86 can be used to adjust the operating speed of the main router drive motor. While the display 16 shown in the embodiment of FIGS. 1–3 does not show the up and down switches, they may be provided if desired. Because the embodiment of FIG. 7 has a removable motor assembly, the display 126 preferably does not interact with the motor assembly to control and display the motor speed. However, such capability is possible with appropriately configured electrical connectors that would be provided to interconnect the display with motor control circuitry. Also, it should be understood that the displays 16 and 126 are preferably powered by accessible, replaceable batteries that are not shown, but which are known to those skilled in the art. The display can also be powered off the line voltage, using batteries to preserve stored values in memory when the line cord is not connected.

With regard to the measurements that are displayed, the appropriate decimal point will be illuminated depending upon whether the display is displaying upright or inverted when English or metric is used. If fractions are used, then the appropriate slash will also be illuminated. The measurement is right justified according to whether the decimal point or slash is used.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the following claims.

What is claimed is:

1. A router having plunge-type operability for driving a router bit and controlling the depth of cut of a router bit relative to a work piece, said router being useable in an upright and in an inverted position, comprising:

a housing assembly having a drive motor being capable of driving a drive shaft to which the router bit can be attached;

a base having a generally planar outer surface and a central opening through which the router bit can extend, and at least a pair of posts operatively connected to said housing assembly;

a depth adjusting mechanism for controlling the depth of cut of the router bit relative to a baseline position, said adjusting mechanism having a plunge depth rod longitudinally adjustably connected to said housing assembly and a stop surface associated with said base, which stop surface cooperates with an end of the plunge depth rod for limiting the depth of cut of the router bit during operation;

a sensor for generating position signals indicative of the position of said adjustable depth rod, input means responsive to operator manipulation for generating input signals for controlling the operation of the router;

a display responsive to information signals for providing a visual display of information relating to the operation of the router;

processing means for receiving said position and input signals and for selectively generating said information and position control signals.

2. A router as defined in claim 1 wherein said processing means is adapted to store data defining said baseline position for the router bit responsive to operator manipulation of said input means, said baseline position including a zero position of the router bit when it initially engages the work piece.

3. A router as defined in claim 1 wherein said depth adjusting mechanism includes a depth adjusting motor that is responsive to position control signals for adjusting the position of said plunge depth rod relative to said base and thereby adjusting the depth of cut of the router bit.

4. A router as defined in claim 3 wherein said processing means receives said position signals and said input signals and responsively generates said position control signals for controlling the depth of cut of the router bit relative to said zero position.

5. A router as defined in claim 3 wherein said depth adjusting motor is operatively connected to a pinion gear that engages a rack portion of said plunge depth rod, the rotation of said pinion gear in first and second directions causing said plunge depth rod to move relative to said housing assembly in first and second directions generally parallel to said drive motor shaft.

6. A router as defined in claim 3 wherein said depth adjusting motor is operatively connected to said plunge depth rod, which connection comprises an elongated screw that engages an internal thread in said plunge depth rod, said depth rod being prevented from rotation by said housing assembly, the rotation of said screw in first and second directions causing said plunge depth rod to move relative to said housing assembly in first and second directions generally parallel to said drive motor shaft.

7. A router as defined in claim 6 wherein the outer end of said elongated screw has a transverse portion capable of engaging a locking member of said base whereby said depth adjusting motor is capable of moving the plunge depth rod relative to the housing assembly when said locking member is disengaged and is capable of moving the housing assembly relative to said base when said locking member is engaged.

8. A router as defined in claim 7 wherein said transverse portion is an annular flange formed by removing an annular portion of the screw near the outer end of the screw and said locking member is moveable relative to said base and has a keyhole shaped opening therein, a larger portion thereof being sized to permit penetration of the end of the screw therein and a smaller portion thereof being sized to engage said transverse portion and retain the screw when said locking member is moved into engagement.

9. A router as defined in claim 1 wherein said display comprises a plurality of multiple segment characters, with each character being capable of displaying alpha-numeric characters.

10. A router as defined in claim 9 wherein said display includes a display module that includes said plurality of characters aligned in a generally predetermined orientation.

11. A router as defined in claim 10 wherein said orientation is perpendicular to the longitudinal direction of the drive motor drive shaft and is capable of being inverted generally 180 degrees.

12. A router as defined in claim 10 wherein said display module is capable of being physically reoriented at an inverted orientation.

13. A router as defined in claim 10 wherein said display module includes two sets of said plurality of characters, one set being inverted generally 180 degrees relative to the other.

14. A router as defined in claim 9 wherein said display is one of a liquid crystal display or a light emitting diode display.

15. A router as defined in claim 9 wherein said display has at least six aligned characters, with a forward slash segment separating each pair of characters, said display being capable of displaying fractions of inches responsive to said processing means determining said fractions and generating display information and applying the same to said display.

16. A router as defined in claim 1 wherein said depth adjusting mechanism includes an engageable lock for selectively locking said plunge depth rod relative to said housing assembly, whereby said depth adjusting motor is capable of moving the plunge depth rod relative to the housing assembly when said lock is disengaged and is capable of moving the housing assembly relative to said base when the lock is engaged.

17. A router as defined in claim 1 wherein said input means generates input signals for incrementing or decrementing the depth of cut responsive to operator manipulation thereof.

18. A router as defined in claim 17 wherein said input means comprises switch means for selectively incrementing or decrementing the depth of cut responsive to operator manipulation thereof.

19. A router as defined in claim 17 wherein said input means generates input signals for increasing or decreasing the speed of said drive motor and said display displays the speed of operation of said drive motor.

20. A router as defined in claim 1 wherein said display receives said information signals from said processing means and visibly displays the depth of cut in English or metric increments.

21. A router as defined in claim 1 wherein said sensor comprises a rotary sensing device operatively associated with said depth adjusting motor, said device generating rotary position signals and applying the same to said processing means.

22. A router as defined in claim 1 wherein said sensor is operatively connected to said plunge depth rod, said sensor being capable of producing an electrical signal that is indicative of the specific position of the plunge depth rod relative to the housing assembly.

23. A router as defined in claim 1 wherein said processing means includes memory means for selectively storing data indicative of said control signals and information relating to the operation of the router.

24. A method of specifying and controlling the depth of cut in a work piece by a plunge router of the type which has a housing assembly containing a drive motor having a drive shaft to which a router bit can be attached, a base having a generally planar outer surface and a central opening through which the router bit can extend, and at least a pair of posts operatively connected to said housing assembly, a depth adjusting mechanism for controlling the depth of cut of the router bit relative to a baseline position, the adjusting mechanism having a plunge depth rod that is longitudinally adjustable and lockable to the housing assembly and a stop surface associated with said base and cooperating with an end of said plunge depth rod for limiting the depth of cut of the router bit during operation, a sensor for generating position signals indicative of the position of the adjustable depth rod, a display responsive to information signals for providing a visual display of information relating to the operation of the router, and a processing means for receiving said position and input signals and for selectively generating said information and position control signals, comprising the steps of:

- adjusting the depth adjusting mechanism to bring the router bit into contact with the surface of the work piece;
- adjusting the plunge depth rod to contact the stop surface;

locking the plunge depth rod in place;

manipulating the input means to set a zero baseline position;

unlocking the plunge depth rod;

adjusting the adjusting mechanism to the desired depth of cut by observing depth of cut values being displayed by the display; and, locking the plunge depth rod in place.

25. A method of specifying and controlling the depth of cut in a work piece by a plunge router of the type which has a housing assembly containing a drive motor having a drive shaft to which a router bit can be attached, a base having a generally planar outer surface and a central opening through which the router bit can extend, and at least a pair of posts operatively connected to said housing assembly, a motorized depth adjusting mechanism for controlling the depth of cut of the router bit relative to a baseline position, the adjusting mechanism having a plunge depth rod that is longitudinally adjustable relative to the housing assembly and a stop surface associated with said base and cooperating with an end of said plunge depth rod for limiting the depth of cut of the router bit during operation, a sensor for generating position signals indicative of the position of the adjustable depth rod, a display responsive to information signals for providing a visual display of information relating to the operation of the router, and a processing means for receiving said position and input signals and for selectively generating said information and position control signals, comprising the steps of:

adjusting the depth adjusting mechanism to bring the router bit into contact with the surface of the work piece;

adjusting the plunge depth rod to contact the stop surface;

manipulating the input means to set a zero baseline position; and adjusting the adjusting mechanism to the desired depth of cut by observing depth of cut values being displayed by the display.

26. A plunge router for driving a router bit, said router being useable in an upright and in an inverted position, comprising:

a housing assembly having a drive motor being capable of driving a drive shaft to which the router bit can be attached;

a base having a central opening through which the router bit can extend, and being operatively connected to said housing assembly;

a depth adjusting mechanism for controlling the depth of cut of the router bit relative to a baseline position, said depth adjusting mechanism including a plunge depth rod that is longitudinally adjustable relative to the housing assembly and a stop surface associated with the base and cooperating with an end of the plunge depth rod for limiting the depth of cut of the router bit during operation, and a sensor for generating position signals indicative of the position of the adjustable depth rod;

input means responsive to operator manipulation for generating input signals for controlling the operation of the router;

a display responsive to information signals for providing a visual display of information relating to the operation of the router, wherein said display comprises a plurality of multiple segment alpha-numeric characters aligned in a generally predetermined orientation, said display being capable of being reoriented at an inverted orientation; and, processing means for receiving said input and position signals and for selectively generating said information signals.

27. A router as defined in claim 26 wherein said predetermined orientation of said characters is perpendicular to the longitudinal direction of the drive motor drive shaft.

* * * * *